United States Patent [19]

Hakozaki

[11] 3,877,018

[45] Apr. 8, 1975

[54] SHIFT REGISTER DISPLAY FOR LIGHT PEN

[75] Inventor: Hiroshi Hakozaki, Fujisawa, Japan

[73] Assignee: Mitsui Shipbuilding & Engineering Co., Ltd., Tokyo, Japan

[22] Filed: Feb. 21, 1974

[21] Appl. No.: 444,494

[30] Foreign Application Priority Data

Feb. 22, 1973 Japan ................................ 48-21828

[52] U.S. Cl. .............. 340/337; 178/18; 235/92 DE; 250/553; 340/365 P

[51] Int. Cl. ............................................ G08b 5/36

[58] Field of Search ............. 340/337, 365 P, 365 S; 250/551, 553; 235/92 V, 92 DE; 178/18

[56] References Cited

UNITED STATES PATENTS

| | | | |
|---|---|---|---|
| 3,337,860 | 8/1967 | O'Hara | 340/324 A |
| 3,543,240 | 11/1970 | Miller et al. | 340/172.5 |
| 3,651,509 | 3/1972 | Ngo | 340/337 X |
| 3,732,369 | 5/1973 | Cotter | 178/18 |
| 3,761,620 | 9/1973 | Graven | 178/18 |
| 3,828,128 | 8/1974 | Dethloff et al. | 178/18 |

*Primary Examiner*—David L. Trafton

[57] ABSTRACT

The display apparatus comprises a plurality of keys in the form of electric lamps, a shift register adapted to sequentially and cyclically light the electric lamps, and a light pen. The light pen is used to receive a light from a lighted lamp for stopping the shifting operation of the shift register thereby designating the key including said lighted lamp.

4 Claims, 1 Drawing Figure

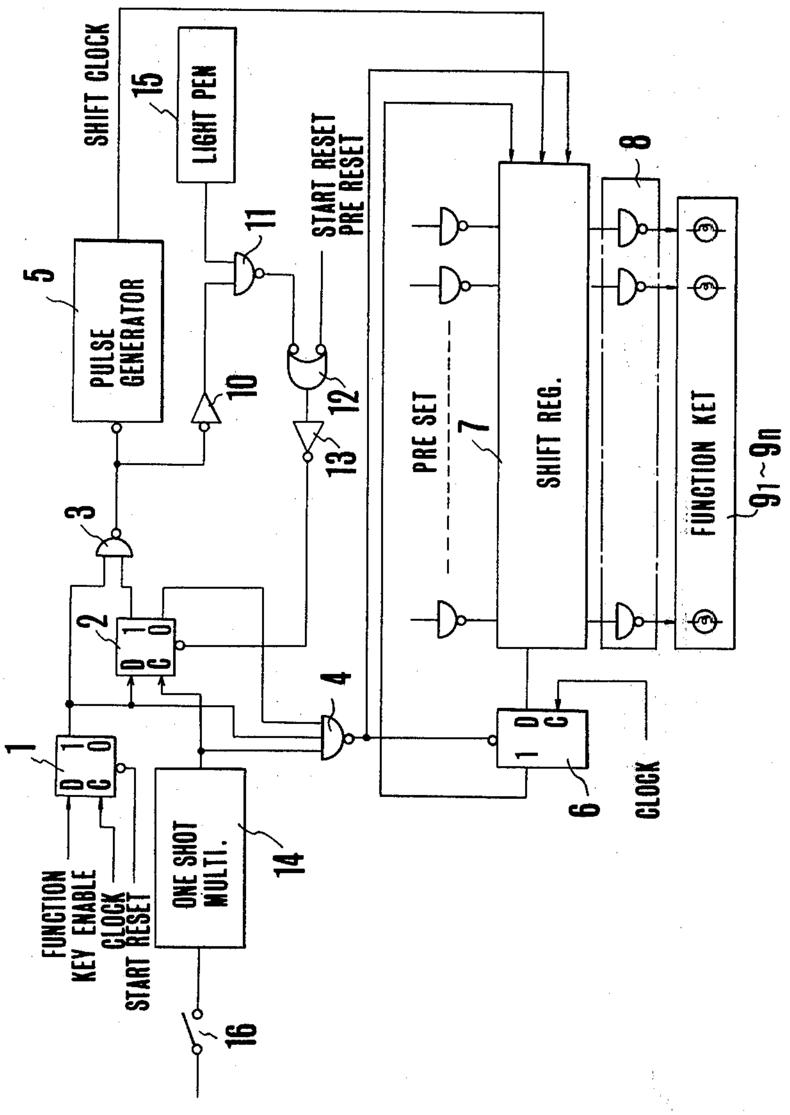
FUNCTION
KEY ENABLE
CLOCK
START RESET
ONE SHOT MULTI.
14
16
1
2
3
4
5
PULSE GENERATOR
SHIFT CLOCK
15
LIGHT PEN
10
11
12
13
START RESET
PRE RESET
PRE SET
7
SHIFT REG.
8
FUNCTION KET
$9_1 \sim 9_n$
6
CLOCK

SHIFT REGISTER DISPLAY FOR LIGHT PEN

BACKGROUND OF THE INVENTION

This invention relates to display apparatus, more particularly to the designations of function keys, letter and digit keys.

Display apparatus of the type just described are used as means for transmitting informations between an electronic computer and an operator for performing man-machine interactions by utilizing displayed patterns as a medium.

Such display apparatus generally comprises a cathode ray tube (CRT) display device, a light pen, a function key, etc. The CRT display device functions to display a pattern on its screen in accordance with the data transmitted from the computer whereas the light pen is used to receive light from the bright spot on the screen for making an offering in the computer, the time of such offering determining the position of the light pen. The function key is used as an external program switch and when operated it transmits a processing information on the computer. The function key includes a plurality of keys provided with switches in a manner like an operating table of a teletypewriter and key lamps which are lighted when associates keys are operated.

However, such an operating table is bulky because the function keys, letter and digit keys comprise a large number of switches and key lamps.

SUMMARY OF THE INVENTION

Accordingly, it is an object of this invention to provide an improved display apparatus capable of making easy to operate the function keys, letter and digit keys and can miniaturize the operating deck.

According to this invention, there is provided display apparatus comprising a plurality of keys constituted by a plurality of electric lamps, a shift register adapted to sequentially and cyclically light the electric lamps, and a light pen utilized to receive light from a lighted lamp for stopping the shifting operation of the shift register thereby designating the key including the lighted lamp.

BRIEF DESCRIPTION OF THE DRAWING

In the accompanying drawing a single FIGURE shows a block diagram of one embodiment of the novel display apparatus embodying the invention.

DESCRIPTION OF THE PREFERRED EMBODIMENT

A preferred embodiment illustrated in the accompanying drawing comprises a D flip-flop circuit 1 which operates to send a "1" signal to the input D of D flip-flop circuit 2 and to one inputs of NAND gate circuits 3 and 4 when it receives a function key enabling signal and a clock signal. The D flip-flop circuit 2 is connected to produce a 1 signal which in turn is applied to a pulse generator 5 through a NAND gate circuit 3 when a light pen switch 16 provided for supplying power to a light pen 15 is enabled to produce a 1 signal through a one shot multivibrator 14. The NAND gate circuit 4 operates such that it resets a D flip-flop circuit 6 and a shift register 7 when the light pen switch 16 is ON, D flip-flop circuit 1 produces 1 output and D flip-flop circuit 2 is in its reset state. The output from the least significant digit of the shift register 7 is applied to D input of the D flip-flop circuit 6 and the 1 output thereof is connected to the most significant digit of shift register 7. The shift clock pulse generated by the pulse generator 5 is applied to the clock input of the shift register 7. The outputs from respective digits of shift register 7 are used to light respective lamps of function keys $9_l$ through $9_n$ via lamp driver 8 and are applied to an electronic computer (not shown) to act as the function selection signals. The output from the NAND gate circuit 3 is also applied via an inverter 10 to one input of a NAND gate circuit 11, the other input thereof being connected to receive an output signal of the light pen 15, the output signal being produced when the light pen receives the light from function keys. The inputs of a NOR gate circuit 12 are connected to receive the output from the NAND gate circuit 11 and a start-reset signal and the output of NOR gate circuit 12 is applied to D flip-flop circuit 2 via an inverter 13 to act as a reset signal.

The display apparatus described above operates as follows. It is assumed now that the flip-flop circuits 1 and 2 are in their reset state by the start-reset signal and concurrently therewith the flip-flop circuit 6 and the shift register 7 are also in their reset state by the application of function key enabling signal and the closure of light pen switch 16. Under these conditions, when D flip-flop circuit 1 is set by the application of a function key enabling signal and when light pen switch ON signal is applied the D flip-flop circuit 2 will be set thus enabling the NAND gate circuit 3 for the pulse generator 5. Accordingly, by the action of the shift clock pulse supplied from the pulse generator 5, a bit generated by D flip-flop circuit 6 is caused to sequentially shift through respective digits of the shift register 7 with the result that its output signals successively light respective lamps of the function keys $9_l$ through $9_n$ via the lamp driver 8. As shown, since the shift register 7 and the D flip-flop circuit 6 are connected in a closed loop circuit, the lamps are lighted sequentially and cyclically. Under these conditions, when the portion of the function keys to be lighted is designated by the light pen 15 which is manually moved to a designated function key, the light pen will receive light when the designated lamp emits light to produce a light signal which is used to reset D flip-flop circuit 2 through NAND gate circuit 11, NOR gate circuit 12 and inverter 13. As a result, the gate 3 for the pulse generator 5 is disenabled thus stopping generation of the shift clock pulse. Thus, substantially concurrently with the designation by the light pen, the shift register stops its shifting operation. In other words, only the lamp of the function key designated by the light pen is lighted and the output produced at this time by the shift register 7 is sent, in a usual manner, to the computer for designating the function key in the computer. The function designation signal from the computer is applied to the shift register 7 via a preset circuit thereof for presetting the same thus lighting the lamp of the designated function key.

With this arrangement, the function keys are required to be provided with only lamps which are repeatedly lighted by the flickering signals supplied by the shift register. When a particular key is designated by the light pen, only the lamp of the designated key is lighted and the pattern signal generated by the shift register at this time is sent to the computer for designating the function key.

In the illustrated embodiment, although the function keys are shown as comprising lamps alone, it is also possible to provide switches for the function keys which are operated to preset the shift register to send function designation signals to the computer.

It will be clear that letter or digit keys may be substituted for the function keys.

In this manner, this invention provides a novel display apparatus wherein it is possible to designate a desired key on the operating table by the operation of a light pen. Moreover, as the respective keys can be formed of lamps alone it is possible to greatly simplify the operation and construction of the display apparatus, thus miniaturizing the same.

What is claimed is:

1. Display apparatus comprising a plurality of keys constituted by a plurality of electric lamps, a shift register adapted to sequentially and cyclically light said electric lamps, and a light pen utilized to receive the light from a lighted lamp for stopping the shifting operation of said shift register thereby designating the key including said lighted lamp.

2. The display apparatus according to claim 1 which further comprises a pulse generator for supplying a shift clock pulse to said shift register, a first flip-flop circuit responsive to a function key enabling signal and a clock pulse, a second flip-flop circuit responsive to the output from said first flip-flop circuit and a light pen switch ON signal, and a first AND gate circuit responsive to the outputs of said first and second flip-flop circuits for operating said pulse generator.

3. The display apparatus according to claim 2 which further comprises a second AND gate circuit, one input thereof being connected to receive the output of said light pen and the other input to the output of said first AND gate circuit through an inverter, and means responsive to the output from said second AND gate circuit for resetting said second flip-flop circuit thereby stopping the operation of said pulse generator.

4. The display device according to claim 1 which further comprises a third flip-flop circuit which is connected between the least significant digit and the most significant digit of said shift register thus causing it to operate cyclically.

* * * * *